United States Patent
German

[19]

[11] Patent Number: 6,152,311
[45] Date of Patent: Nov. 28, 2000

[54] PC SPACE SAVER/COMPUTER CADDY

[76] Inventor: Mitchell German, 5 E. 22nd St., #14H, New York, N.Y. 10010

[21] Appl. No.: 09/375,189

[22] Filed: Aug. 16, 1999

[51] Int. Cl.$^7$ .................................................. A47F 5/10
[52] U.S. Cl. ................. 211/86.01; 211/175; 211/133.2; 248/188.5; 248/442.2
[58] Field of Search .................... 211/86.01, 13.1, 211/69.1, 175, 126.1, 113, 133.2, 133.5; 108/42, 147.19, 147.2, 149; 248/274.1, 298.1, 175, 188.5, 442.2

[56] References Cited

U.S. PATENT DOCUMENTS

| | | | |
|---|---|---|---|
| 2,904,378 | 9/1959 | MacIver | 248/188.5 |
| 3,517,625 | 6/1970 | Swett | 211/126.1 |
| 3,606,949 | 9/1971 | Joyce | 211/126.1 |
| 3,765,633 | 10/1973 | Caudill | 248/274.1 |
| 3,807,319 | 4/1974 | Steanson, Jr. | 108/47 |
| 4,494,465 | 1/1985 | Fick, Jr. | 108/47 |
| 4,570,805 | 2/1986 | Smith . | |
| 4,730,799 | 3/1988 | Foss et al. | 211/60.1 |
| 4,917,250 | 4/1990 | Barbieri et al. . | |
| 4,928,834 | 5/1990 | Neiman . | |
| 4,960,257 | 10/1990 | Waters | 248/442.2 |
| 5,086,936 | 2/1992 | Remmers | 211/126.1 |
| 5,170,719 | 12/1992 | Pestone | 108/47 |
| 5,197,614 | 3/1993 | Dalton et al. | 211/181.1 |
| 5,263,578 | 11/1993 | Narvey | 211/126.1 |
| 5,265,735 | 11/1993 | Hassel et al. | 211/126.1 |
| 5,265,740 | 11/1993 | Hodsden et al. . | |
| 5,292,099 | 3/1994 | Isham et al. | 248/442.2 |
| 5,370,060 | 12/1994 | Wang | 108/47 |
| 5,383,642 | 1/1995 | Strassberg | 248/442.2 |
| 5,526,943 | 6/1996 | Thompson | 211/13.1 |
| 5,746,408 | 5/1998 | Theirl et al. | 248/442.2 |
| 5,779,206 | 7/1998 | Harris et al. | 248/274.1 X |
| 5,813,354 | 9/1998 | Scott | 108/147.19 |
| 5,865,325 | 2/1999 | Comstock | 211/86.01 |
| 5,894,940 | 4/1999 | Gusdorf et al. | 211/13.1 |
| 5,899,345 | 5/1999 | Fuller et al. . | |
| 5,931,316 | 8/1999 | Carpinelli | 211/86.01 |
| 5,996,507 | 12/1999 | Joseph | 108/147.19 |
| 6,015,132 | 1/2000 | Belle | 248/442.2 |

*Primary Examiner*—Daniel P. Stodola
*Assistant Examiner*—Jennifer E. Novosad
*Attorney, Agent, or Firm*—Michael I. Kroll

[57] ABSTRACT

A storage device (10) for attachment to the outside of a personal computer (12) for holding articles (20) like papers and pencils. The storage device (10) has bins (16) and a wire basket (18) having elements (24) for adjusting its height and elements (28) for adjusting its width. Elements (24, 28) for adjusting the height and width comprise mating male (40) and female (38) members being slidably adjustable to fit variously sized personal computers (12).

3 Claims, 15 Drawing Sheets

PC SPACE SAVER/COMPUTER CADDY

BACKGROUND OF THE INVENTION

1. Field of the Invention

The present invention relates generally to desktop storage devices and, more specifically, to a modular storage unit comprising a number of storage containers which can be used separately or in concert with a frame which can be hung onto a personal computer. Said modular storage organizer having means for adjusting the height and having means for adjusting the width of said organizer can be configured to fit various types of tower-like personal computers.

Additional embodiments are provided whereby various other types of components serving the same general purpose are substituted therein and various components are used in a standalone configuration.

2. Description of the Prior Art

There are other storage devices designed for displaying and storing desktop articles. Typical of these is U.S. Pat. No. 5,265,740 issued to Hodsden on Nov. 30, 1993.

Another patent was issued to Fuller et al. on May 4, 1999 as U.S. Pat, No. 5,899,345. Yet another U.S. Pat. No. 4,917,250 was issued to Barbieri et al. on Apr. 17, 1990 and still yet another was issued on May 29, 1990 to Nelman as U.S. Pat. No. 4,928,834.

Another patent was issued to Smith on Feb. 18, 1986 as U.S. Pat. No. 4,570,805.

U.S. Pat. No. 5,265,740

Inventor: John B. Hodsden et al.

Issued: Nov. 30, 1993

An apparatus for storage of computer media has side stands supporting adjustable shelves to accommodate computer media of varying heights, widths, and depths. Brackets supporting the shelves engage with holes formed in the side stands to releasably secure the shelves over a range of heights. The shelves are L-shaped and are open on top. The shelves may have dividing tabs to facilitate the storing and dispensing of computer media and the spacing between the tabs may be varied to accommodate computer media of varying widths. A lid and a bottom are secured to the side stands to increase the apparatus overall structural strength and rigidity. A reinforcing member extends across the bottom between the side stands to ensure that the side stands remain parallel to each other and perpendicular to the lid and bottom.

U.S. Pat. No. 4,570,805

Inventor: Irving Smith

Issued: Feb. 18, 1986

A foldable display stand of sheet material has a back panel having at least one elongated transverse slit therein, a pair of side panels each having first and second opposing edges of which the first edge is hingedly connected to a respective one of two opposite side edges of the back panel so that each of the side panels can be positioned along substantially the same plane as the back panel, and at least one front panel having first and second opposite sides which are respectively hingedly attached to the second edges of the side panels, so that the front panel extends along a plane substantially parallel to the back plane. The display stand further includes at least one shelf hingedly connected to an edge of the front panel which extends between the first and second sides of the front panel, the shelf extending from such edge of the front panel through the associated slit in the back panel. There is further provided a biasing arrangement operative for urging the side panels into substantially parallel planes substantially normal to those of the front and back panels, the biasing arrangement including transverse walls each connected to one of the side panels substantially centrally thereof and having a slot which opens toward the shelf, and an endless elastic element having two reversing portions received in the slots and two element portions extending along the opposite major surface of the transverse walls between the reversing portions.

U.S. Pat. No. 4,928,834

Inventor: Richard D. Neiman

Issued: May 29, 1990

A safety lock for securing the end of a horizontal beam to a vertical post in a structural frame for wide span shelving. A tab on the end of the beam forces the side of an open box-shape post with slots in the side to yield during assembly of the beam to the post. When the tab enters a slot on the post side, the side springs back, locking the tab in the slot to prevent the dislodgement of the beam from the post.

U.S. Pat. No. 4,917,250

Inventor: Raul Barbieri et al.

Issued: Apr. 17. 1990

A shelf furniture unit, comprising trestle sides with their front legs and rear legs upperly hinged, at least some of the shelves being rotatably supported by the front legs and by bars forming with said shelves an articulated parallelogram structure, with at least one of the shelves arranged to cooperate with the rear legs in order to modify the inclination of the shelves and to enable the legs to be closed together.

U.S. Pat. No. 5,899,345

Inventor: Stephen M. Fuller et al.

Issued: May 4, 1999

A multiple product display stand is disclosed which is freestanding and generally rectangular in shape with a rearwardly inclined open front to more openly display the products to the consumer. The display stand has a means for presenting additional packaging to consumers so that they will be able to select and package a desired selection of the products being displayed upon one or more vertically spaced, rearwardly inclined shelves.

While these storage devices designed for displaying and storing desktop articles may be suitable for the purposes for which they were designed, they would not be as suitable for the purposes of the present invention, as hereinafter described.

SUMMARY OF THE PRESENT INVENTION

The present invention discloses a storage device for attachment to the outside of a personal computer for holding articles, e.g., papers and pencils. The device has bins and a wire basket having means for adjusting its height and means for adjusting its width. Means for adjusting the height and width comprise mating male and female members being slidably adjustable to fit variously sized personal computers. Embodiments are also disclosed of the bins and wire baskets being separately packaged.

A primary object of the present invention is to provide an organizer, which can be positioned on a personal computer to fully utilize the space occupied by said personal computer.

Another object of the present invention is to provide an organizer having leg members which can be height adjusted to fit various sizes of personal computers.

Yet another object of the present invention is to provide an organizer having horizontal members which can be width adjusted to fit various sizes of personal computers.

Additional objects of the present invention will appear as the description proceeds.

The present invention overcomes the shortcomings of the prior art by providing a modular storage unit comprising a number of storage containers which can be used separately or in concert with a frame which can be hung onto a personal computer. Said modular storage organizer having means for adjusting the height and having means for adjusting the width of said organizer can be configured to fit various types of tower-like personal computers. Additional embodiments are provided whereby various other types of components serving the same general purpose are substituted therein and various components are used in a standalone configuration.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
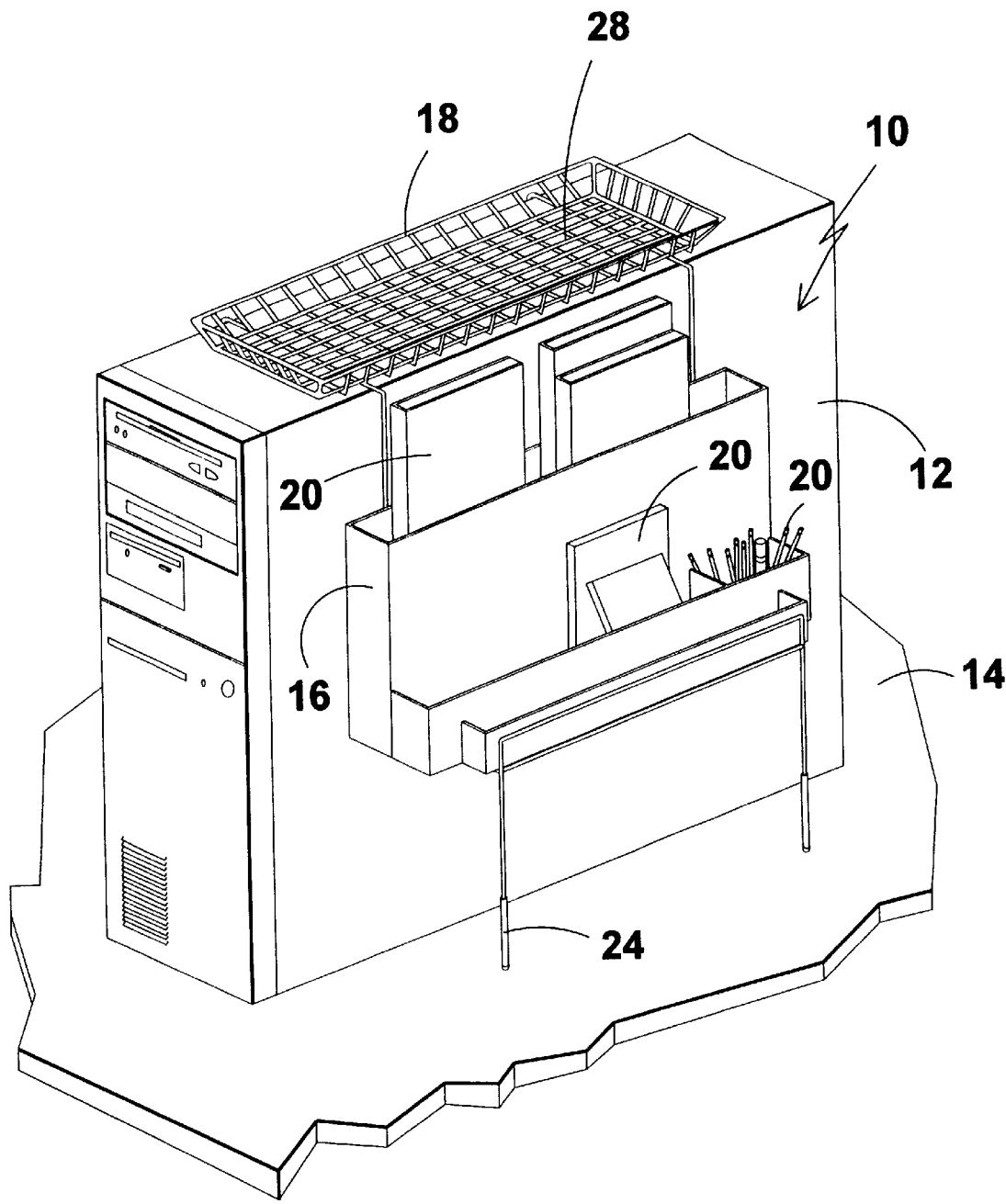
FIG. 1 is a perspective view of the preferred embodiment of the present invention in use. Shown is a personal computer having a plurality of bins and wire basket for the storage or various workstation articles such as papers, books, diskettes, CD-ROMs, notepads, writing implements, etc., the organizer has means for adjusting the height and means for adjusting the width to conform to various tower-like personal computers.

With regard to reference numerals used, the following numbering is used throughout the drawings:
10 present invention
12 personal computer
14 work surface
16 bins
18 wire basket
20 articles
22 elastomeric pads
24 means for adjusting height
26 legs
28 means for adjusting width
30 bin support
32 standoff member
34 dividers
36 compartments
38 female member
40 male member
42 cavity
44 direction arrows
46 vertical file sorter
48 housing
50 means for attaching

DESCRIPTION OF THE PREFERRED EMBODIMENT(S)

In order that the invention may be more fully understood, it will now be described, by way of example, with reference to the accompanying drawings in which FIGS. 1 through 17, illustrate the present invention being a modular storage unit for a personal computer.

Turning to FIG. 1, shown therein is a perspective view of the preferred embodiment of the present invention 10 in use. Shown is a personal computer 12 positioned on a work surface 14 having a plurality of bins 16 and wire basket 18 for the storage of various workstation articles 20 such as papers, books, diskettes, CD-ROMs, notepads, writing implements, etc. The organizer 10 has means 24 for adjusting the height and means 28 for adjusting the width to conform to various tower-like personal computers 12.

Figure 2:
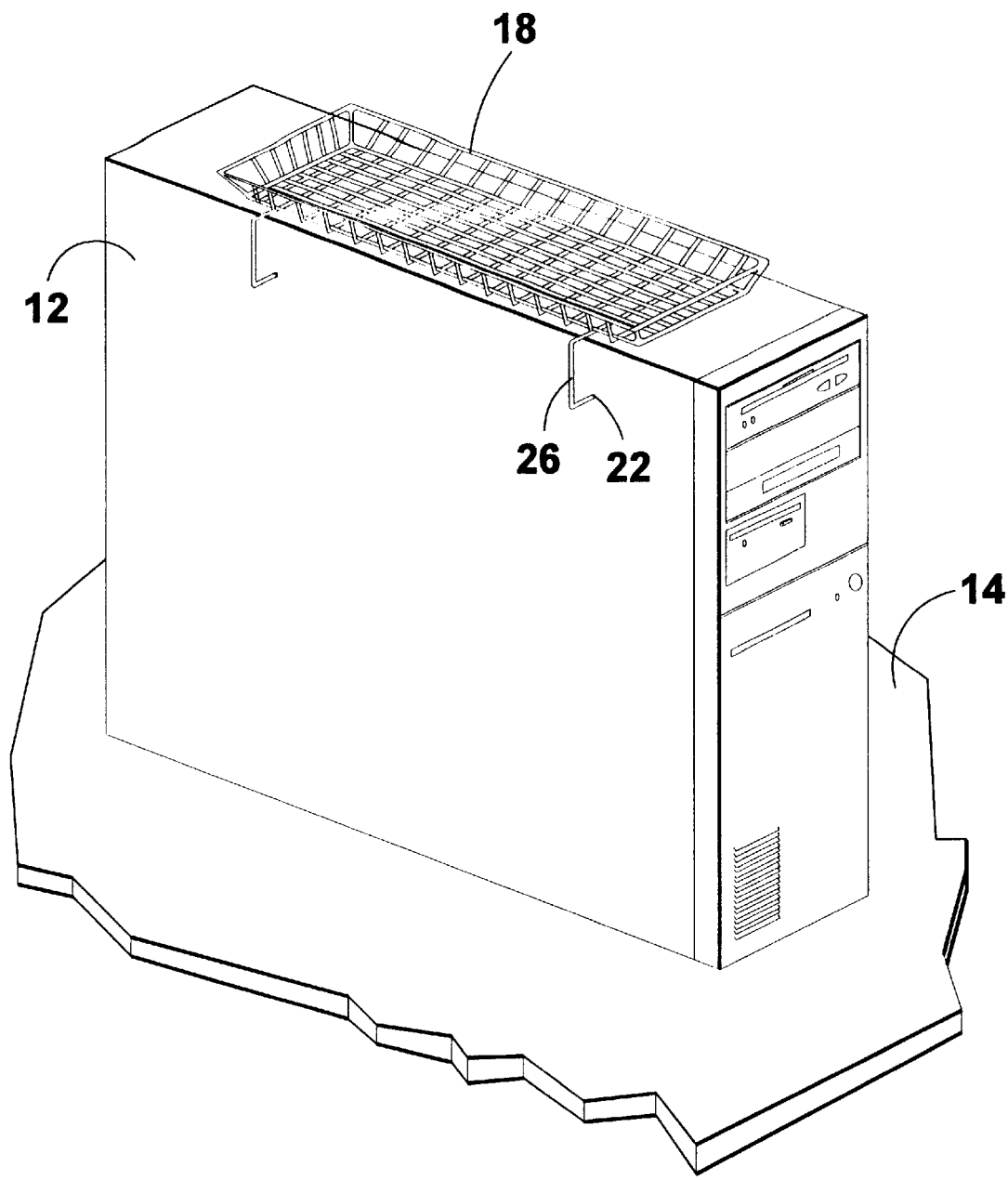
FIG. 2 is a perspective view of the other side of the personal computers shown in FIG. 1. Shown are the support members having elastomeric pads located on the ends of the leg members.

Turning to FIG. 2, shown therein is a perspective view of the other side of the personal computer 12 shown in FIG. 1. Shown are the support members having elastomeric pads 22 located on the ends of the leg members 26 of the wire basket 18.

Figure 3:
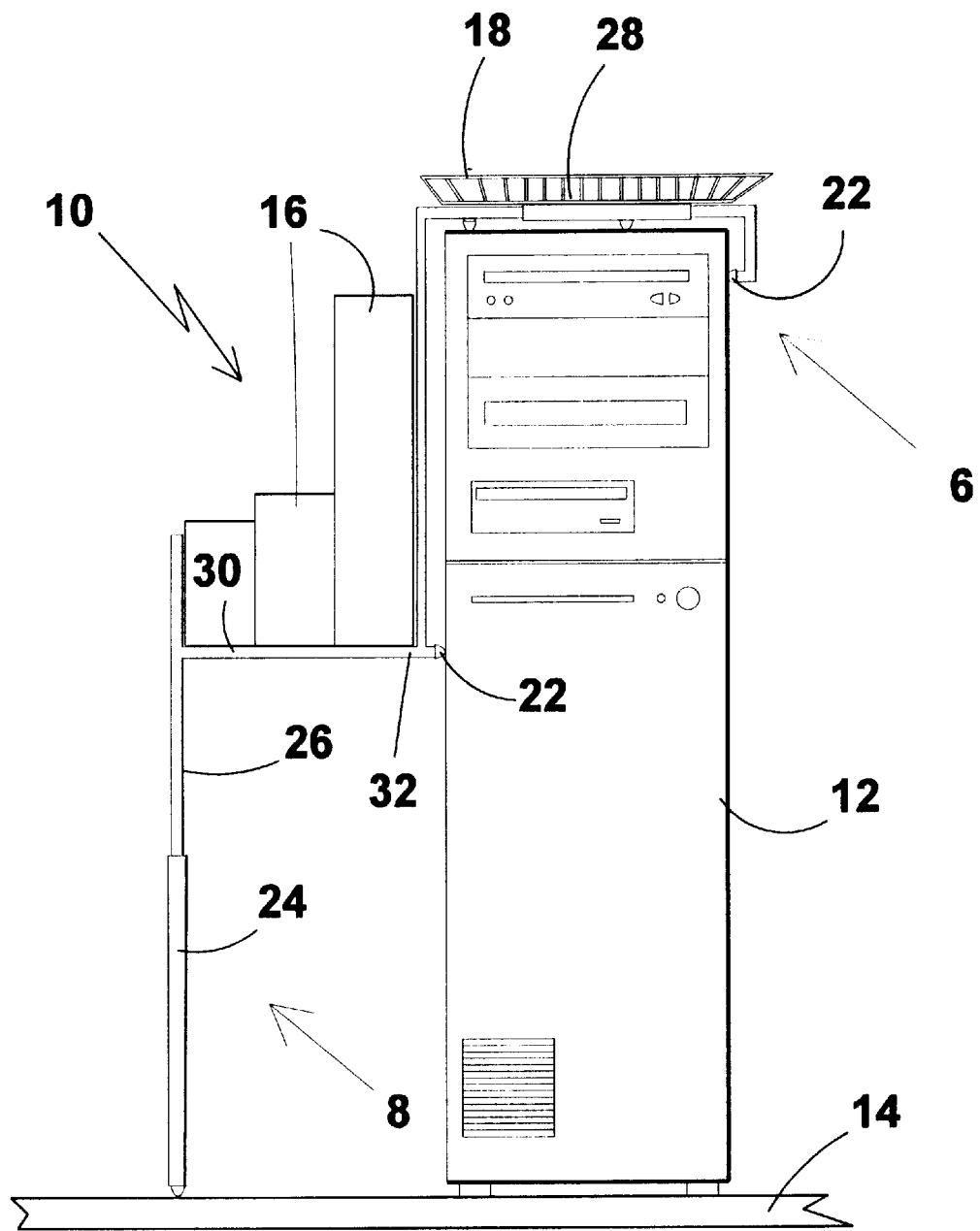
FIG. 3 is a front elevation of the preferred embodiment of the present invention. Shown is the organizer having a plurality of bins and wire basket selectively positioned on a personal computer. The organizer having means for adjusting the height of the leg member and having means for adjusting the width of the organizer would permit the use of said organizer with various tower-like computers. Also shown is a bin support section of the frame having standoff members having elastomeric pads providing additional support for the bins. All contact point with the personal computer is by means of elastomeric pads.

Turning to FIG. 3, shown therein is a front elevation of the preferred embodiment of the present invention 10. Shown is the organizer having a plurality of bins 16 each bin forming a compartment open at the top and wire basket 18 selectively positioned on a personal computer 12. The bins 16 are positioned adjacent to each other in side by side relation. The organizer having means 24 for adjusting the height of the leg member 26 and having horizontally disposed means 28 for adjusting the width of the organizer would permit the use of said organizer with various tower-like computers 12. Also shown is a bin 16 support section 30 of the frame having leg-like standoff members 32 having elastomeric pads 22 providing additional support for the bins 16. All contact points with the personal computer 12 are by means of elastomeric pads 22. The frame support member 30 has a pair of legs 26 thereon for support, with the legs 26 disposed underneath the bins 16 horizontally distal from the personal computer 12, with the frame member 30 disposed horizontally underneath the bins 16 for supporting the bins 16. The frame member 30 is further disposed vertically between the bins 16 and the side of the personal computer 12 and the frame member 30 is disposed horizontally over the top of the personal computer 12. Also, the frame member 30 is disposed vertically downward on a second side of the personal computer 12 opposite the first side of the personal computer for securing the frame 30 to the personal computer 12.

Figure 4:
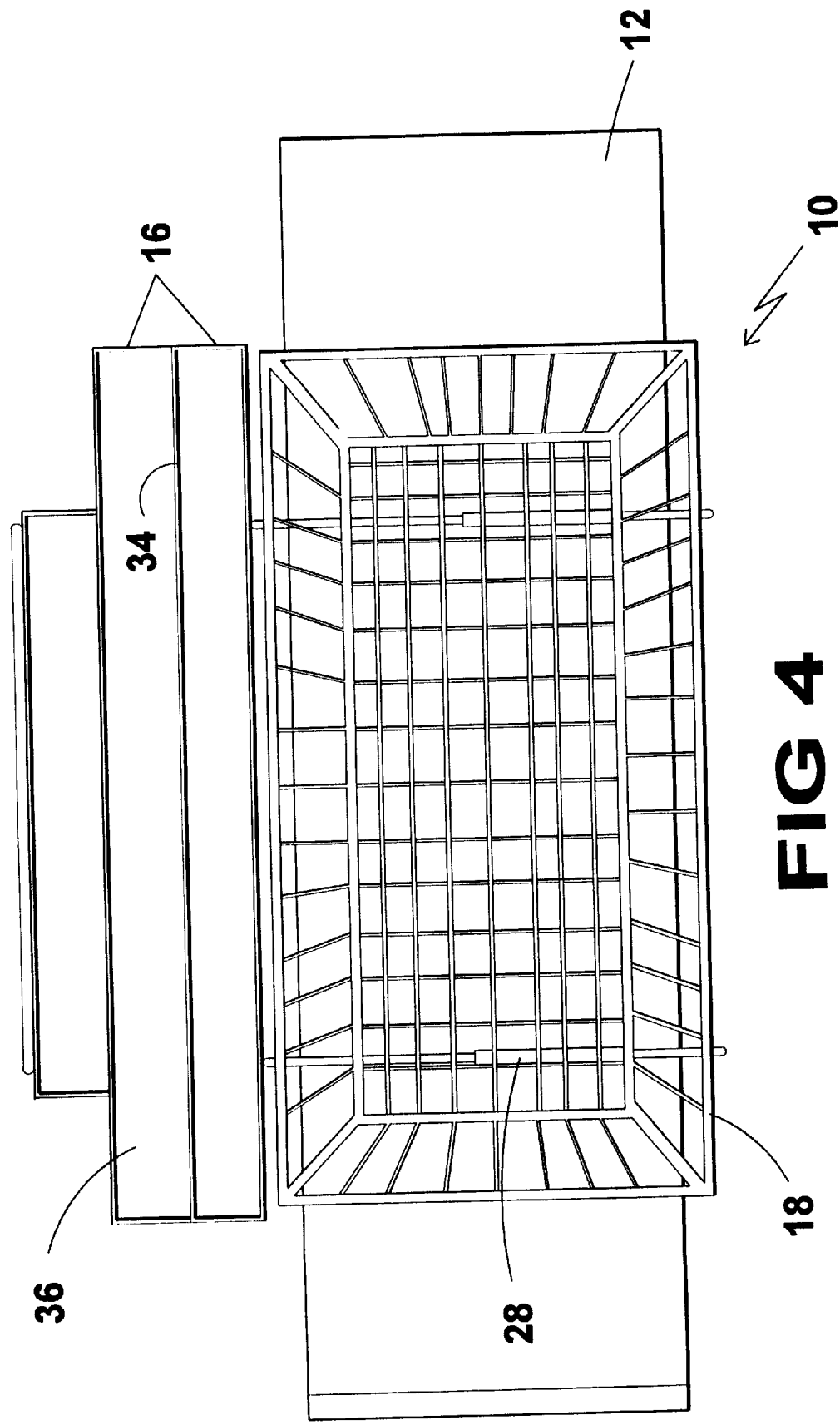
FIG. 4 is a top plan view of the preferred embodiment of the present invention positioned on a tower-like computer as shown in FIG. 1. Shown is a plurality of bins having one or more dividers providing means foe selectively creating various compartments. Also shown is the wire basket situated over the means for adjusting the width of the organizer.

Turning to FIG. 4, shown therein is a top plan view of the preferred embodiment of the present invention 10 positioned on a tower-like computer 12 as shown in FIG. 1. Shown is a plurality of bins 16 having one or more dividers 34 providing means for selectively creating various compartments 36. Also shown is the wire basket 18 situated over the means 28 for adjusting the width of the organizer.

Figure 5:
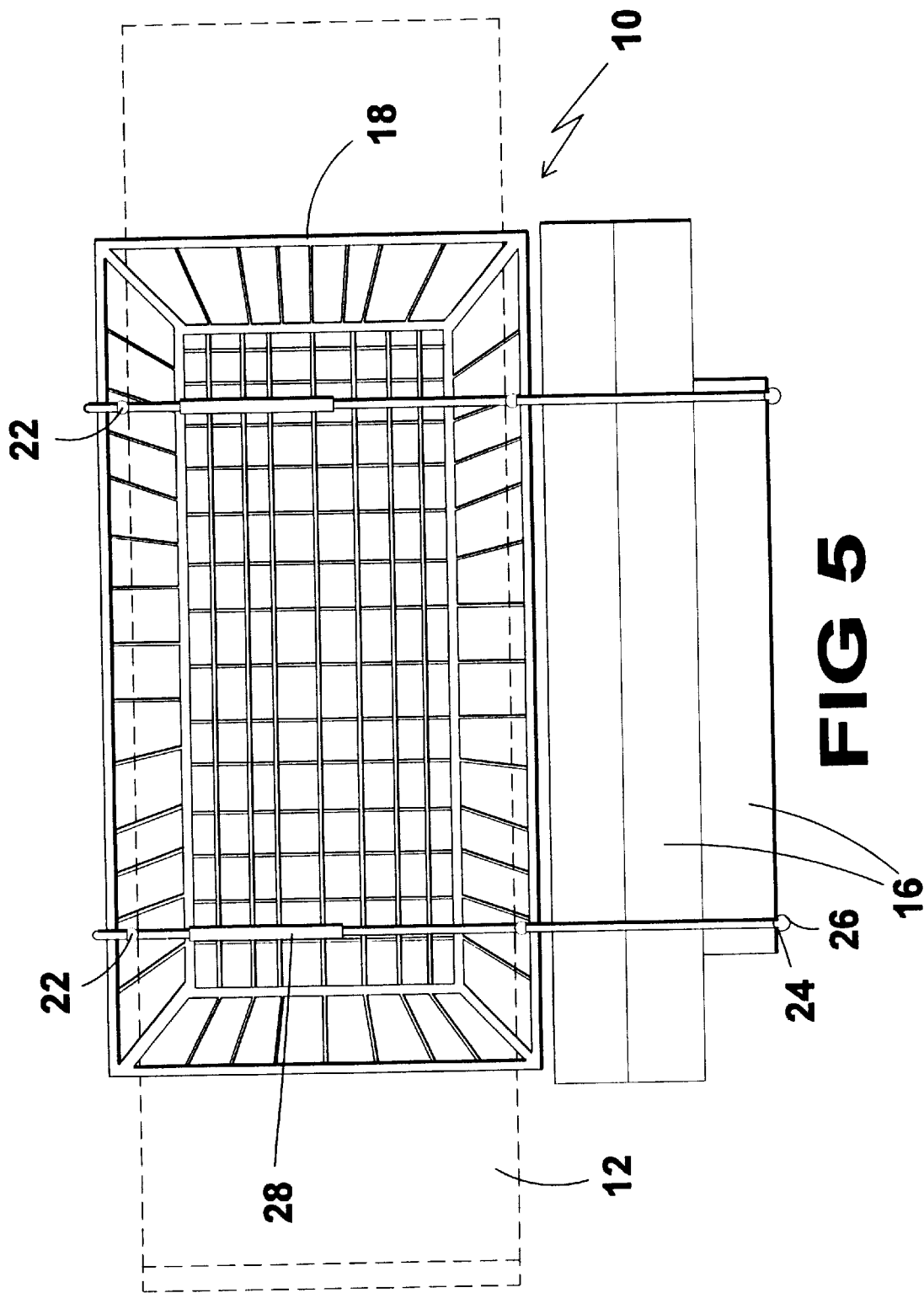
FIG. 5 is a bottom pan view of the preferred embodiment of the present invention positioned on a tower-like computer as shown in FIG. 1. Shown are the leg support members and the vertical adjustment members which are situated under the paper tray. Also shown are a plurality of bins and various padded contact points with the tower-like computer.

Turning to FIG. 5, shown therein is a bottom plan view of the preferred embodiment of the present invention 10 positioned on a tower-like computer 12 as shown in FIG. 1. Shown are the leg support members 26 and the vertical 24 adjustment members which are situated under the paper tray or wire basket 18. Also shown are a plurality of bins 16 and various padded contact points 22 with the tower-like computer 12. Means 28 for adjusting the width are also shown.

Figure 6:
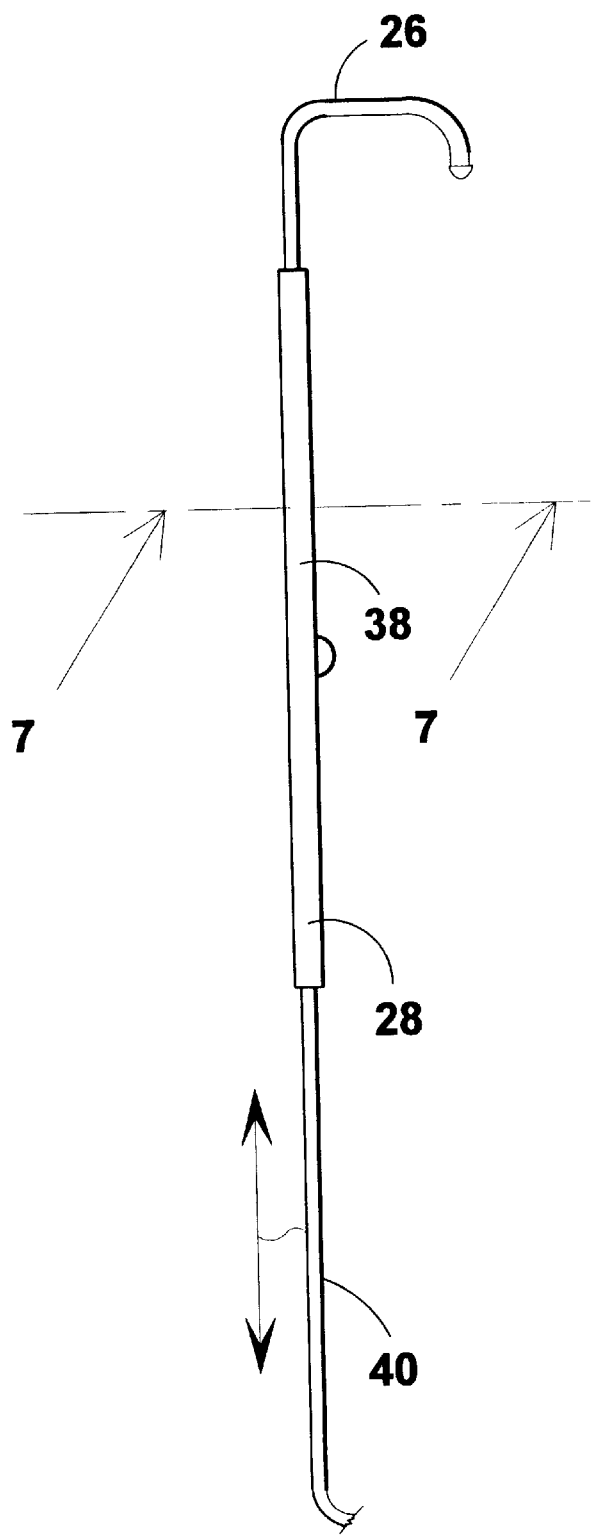
FIG. 6 is an enlarged view of the width adjustment member of the present invention, taken from FIG. 3 as indicated. Shown is a slidably adjustable horizontal member positioned under the paper tray which will provide means for positioning to a various number of tower-like computers.

Turning to FIG. 6, shown therein is an enlarged view of the width 28 adjustment member of the present invention, taken from FIG. 3 as indicated. Shown is a slidably adjustable female horizontal member 38 positioned under the paper tray or wire basket 18 which will receive the male member 40 which provides means for adapting to a various number of tower-like computers. A hook-like, short, leg-like member 26 is shown for securing member 28 to the computer 12.

Figure 7:
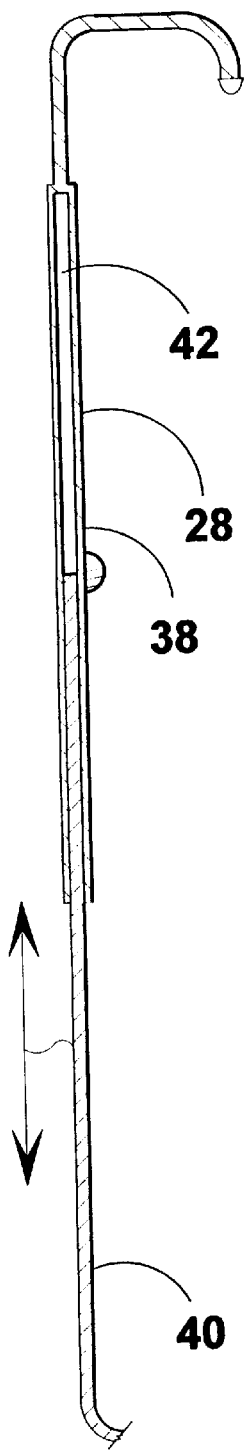
FIG. 7 is a sectional view of the width adjustment member of the present invention, taken from FIG. 6 as indicated. Shown is a cavity within one of the members wherein the other member can be selectively positioned.

Turning to FIG. 7, shown therein is a sectional view of the width 28 adjustment member of the present invention, taken from FIG. 6 as indicated. Shown is a cavity 42 within the female member 38 wherein the male member 40 can be selectively positioned.

Figure 8:
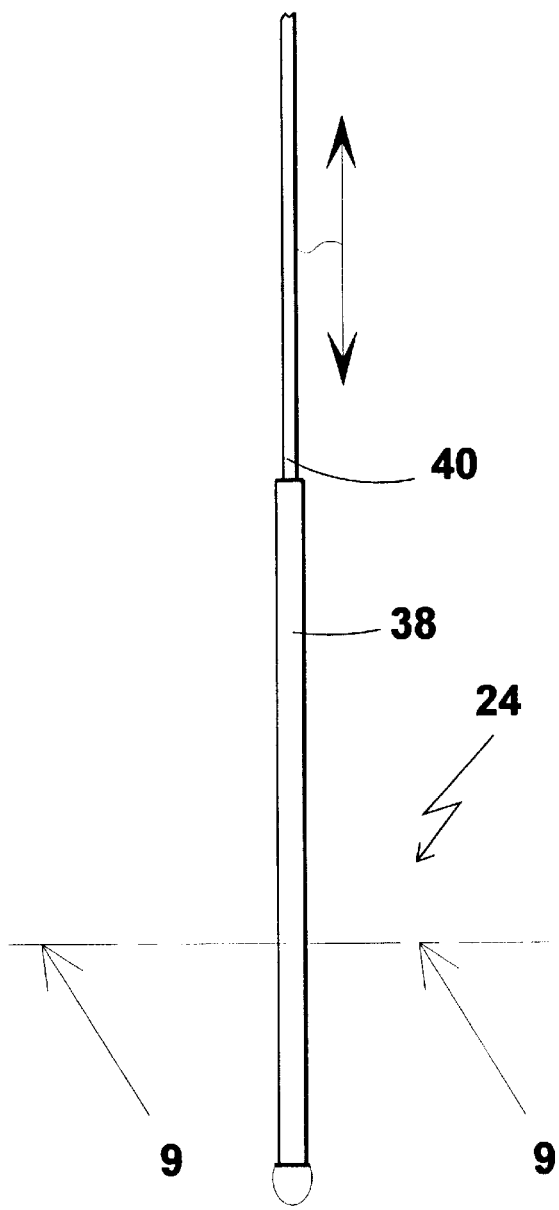
FIG. 8 is an enlarged view of the height adjustment member of the present invention, taken from FIG. 3 as indicated. Shown is a slidably adjustable vertical leg member positioned under the bins which will provide means for positioning to a various number of tower-like computers.

Turning to FIG. 8, shown therein is an enlarged view of the height 24 adjustment member of the present invention, taken from FIG. 3 as indicated. Shown is a slidably adjustable female 38 vertical leg member positioned under the bins which will provide means for receiving male member 40 for adapting to a various number of tower-like computers.

Figure 9:
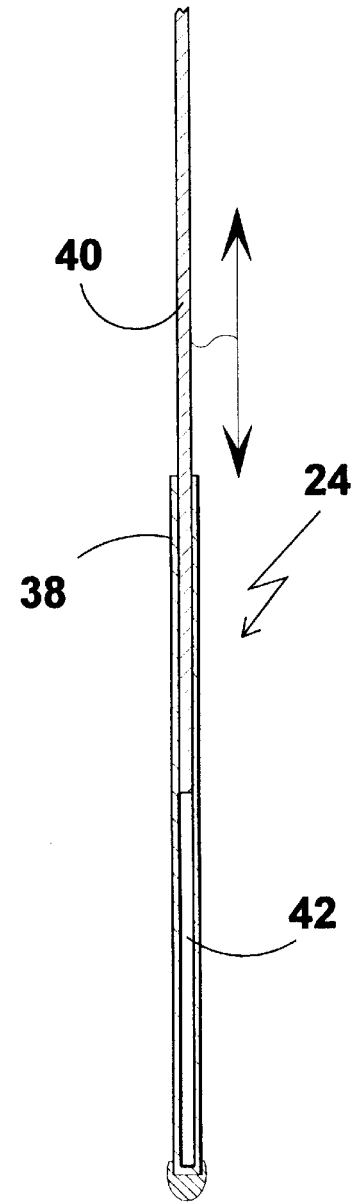
FIG. 9 is a sectional view of the height adjustment member of the present invention, taken from FIG. 8 as indicated. Shown is a cavity within one of the leg members wherein the other member can be selectively positioned.

Turning to FIG. 9, shown therein is a sectional view of the height 24 adjustment member of the present invention, taken from FIG. 8 as indicated. Shown is a cavity 42 within the female leg members 38 wherein the other male member 40 can be selectively positioned.

Figure 10:
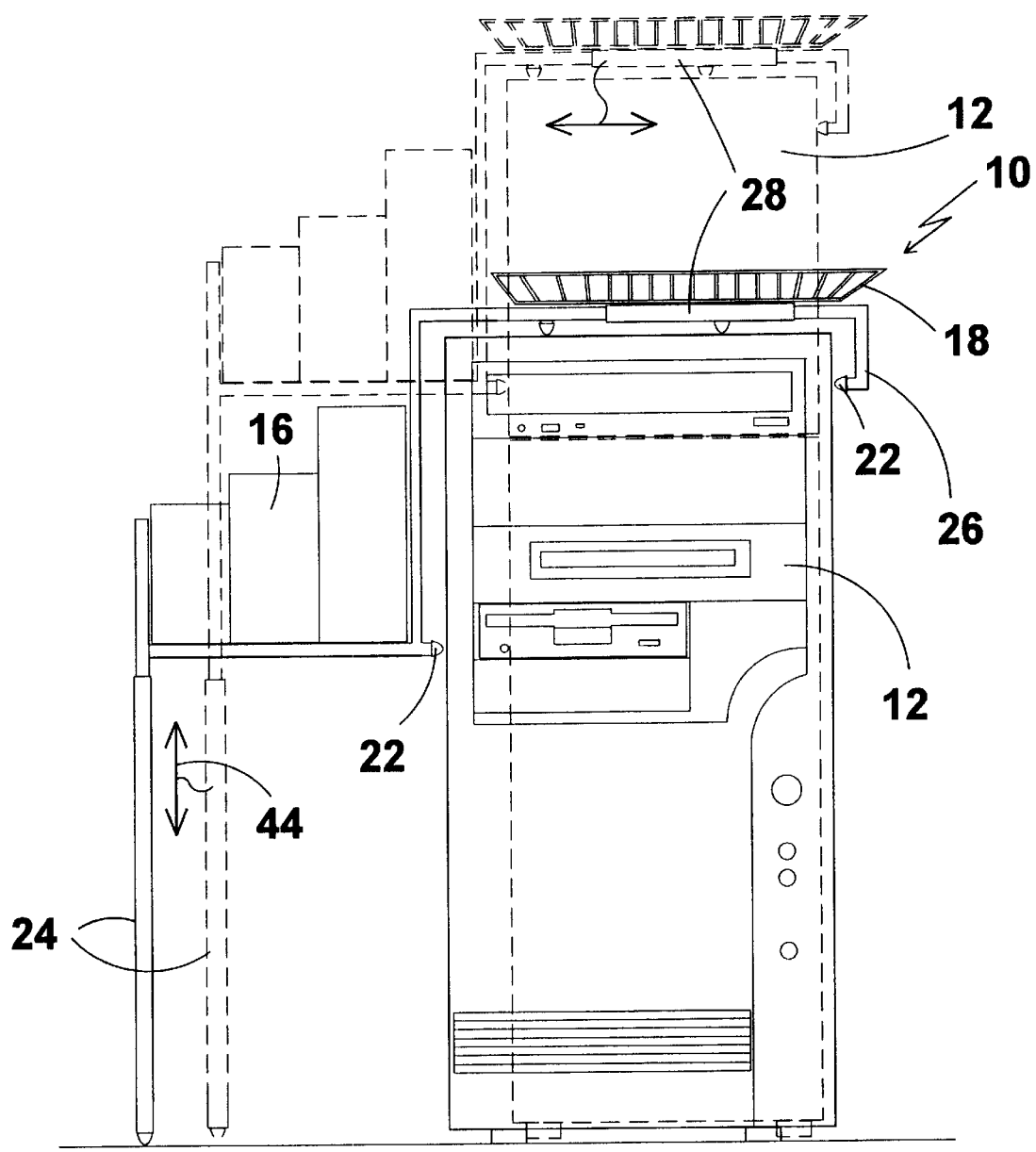
FIG. 10 is an illustrative view of the organizer attached to a smaller tower-like personal computer. Also shown is the organizer, in outline, attached to a larger personal computer, shown in outline, with the necessary adjustment means indicated by arrows.

Turning to FIG. 10, shown therein is an illustrative view of the organizer 10 attached to a smaller tower-like personal computer 12. Also shown is the organizer, in outline, attached to a larger personal computer 12, shown in outline, with the necessary adjustment means indicated by direction arrows 44. Other features previously disclosed are also shown.

Figure 11:
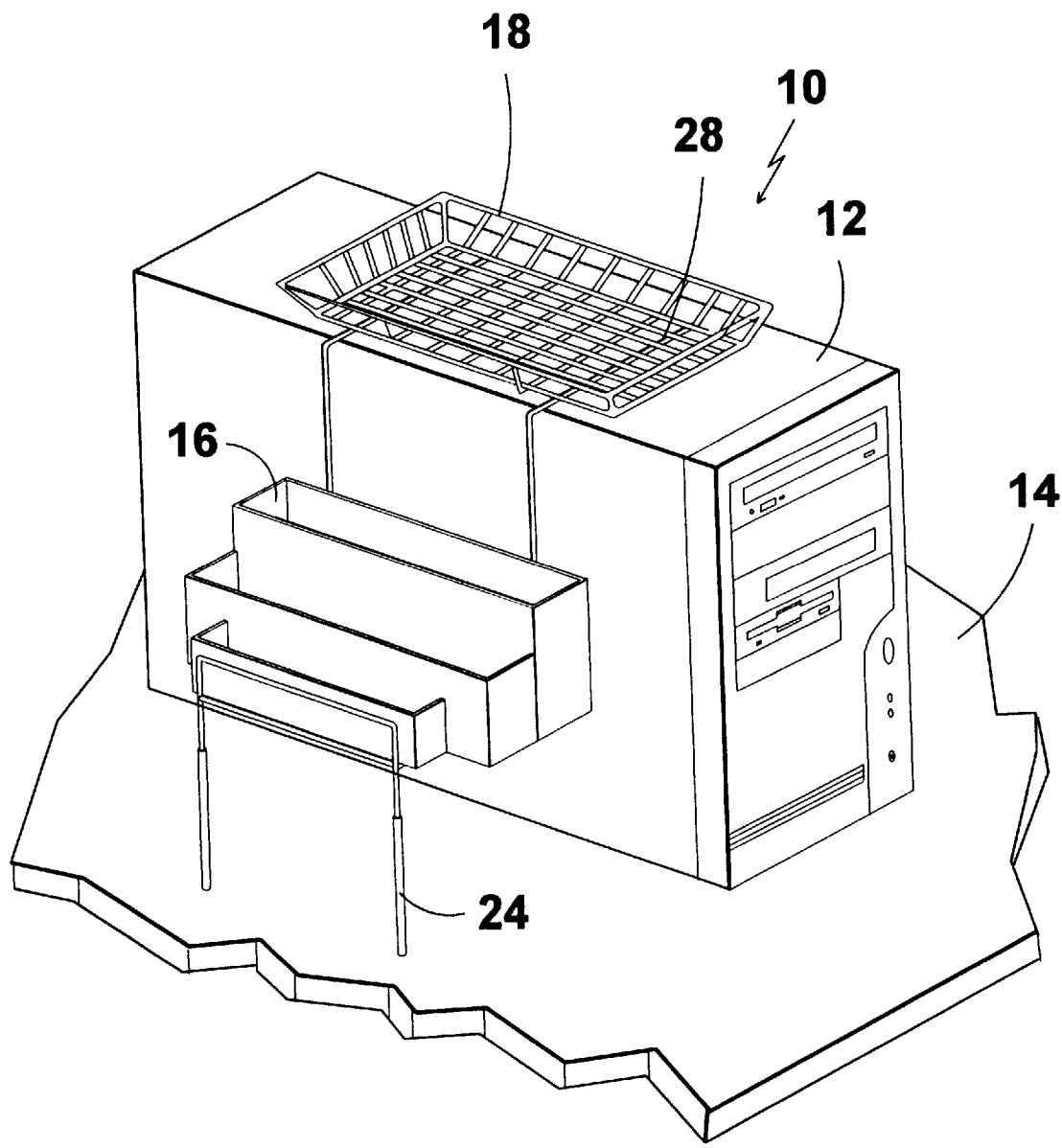
FIG. 11 is a perspective view of the preferred embodiment of the present invention attached to a different tower-like computer. Shown is the organized having a plurality of bins and wire basket for the storage of various workstation articles such as papers, books, diskettes, CD-ROMs, notepads, writing implements, etc . . . , the organizer having means for adjusting the height and means for adjusting the width is selectively adjustable to fit various tower-like personal computers.

Turning to FIG. 11, shown therein is a perspective view of the preferred embodiment of the present invention 10 attached to a different tower-like computer 12. Shown is the organizer having a plurality of bins 16 and wire basket 18 for the storage of various workstation articles such as papers, books, diskettes, CD-ROMs, notepads, writing implements, etc. The organizer has means 24 for adjusting the height and means 28 for adjusting the width being selectively adjustable to fit various tower-like personal computers 12.

Figure 12:
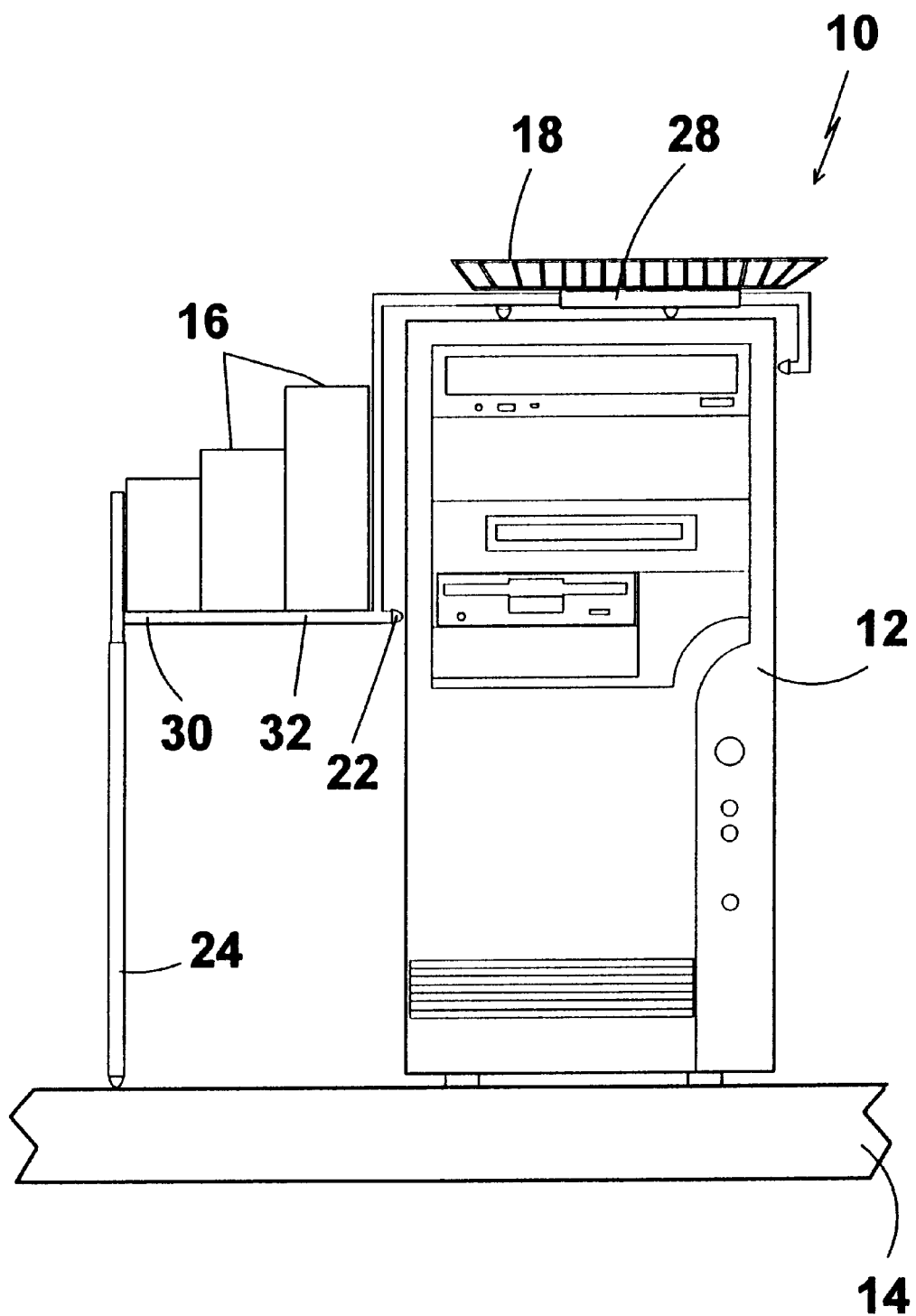
FIG. 12 is a front elevation of the preferred embodiment of the present invention. Shown is the organizer having a plurality of bins and wire basket selectively positioned on a personal computer as shown in FIG. 11. The organizer having means for adjusting the height of the leg member and having means for adjusting the width of the organizer would permit the use of said organizer with various tower-like computers. Also shown is a bin support section of the frame having standoff members having elastomeric pads providing additional support for the bins. All contact point with the personal computer is by means of elastomeric pads.

Turning to FIG. 12, shown therein is a front elevation of the preferred embodiment of the present invention 10. Shown is the organizer having a plurality of bins 16 and wire basket 18 selectively positioned on a personal computer 12 as shown in FIG. 11. The organizer has means 24 for adjusting the height of the leg member and having means 28 for adjusting the width of the organizer would permit the use of said organizer with various tower-like computers 12. Also shown is a bin support section 30 of the frame having standoff members 32 having elastomeric pads 22 providing additional support for the bins 16. All contact point with the personal computer 12 is by means of elastomeric pads 22.

Figure 13:
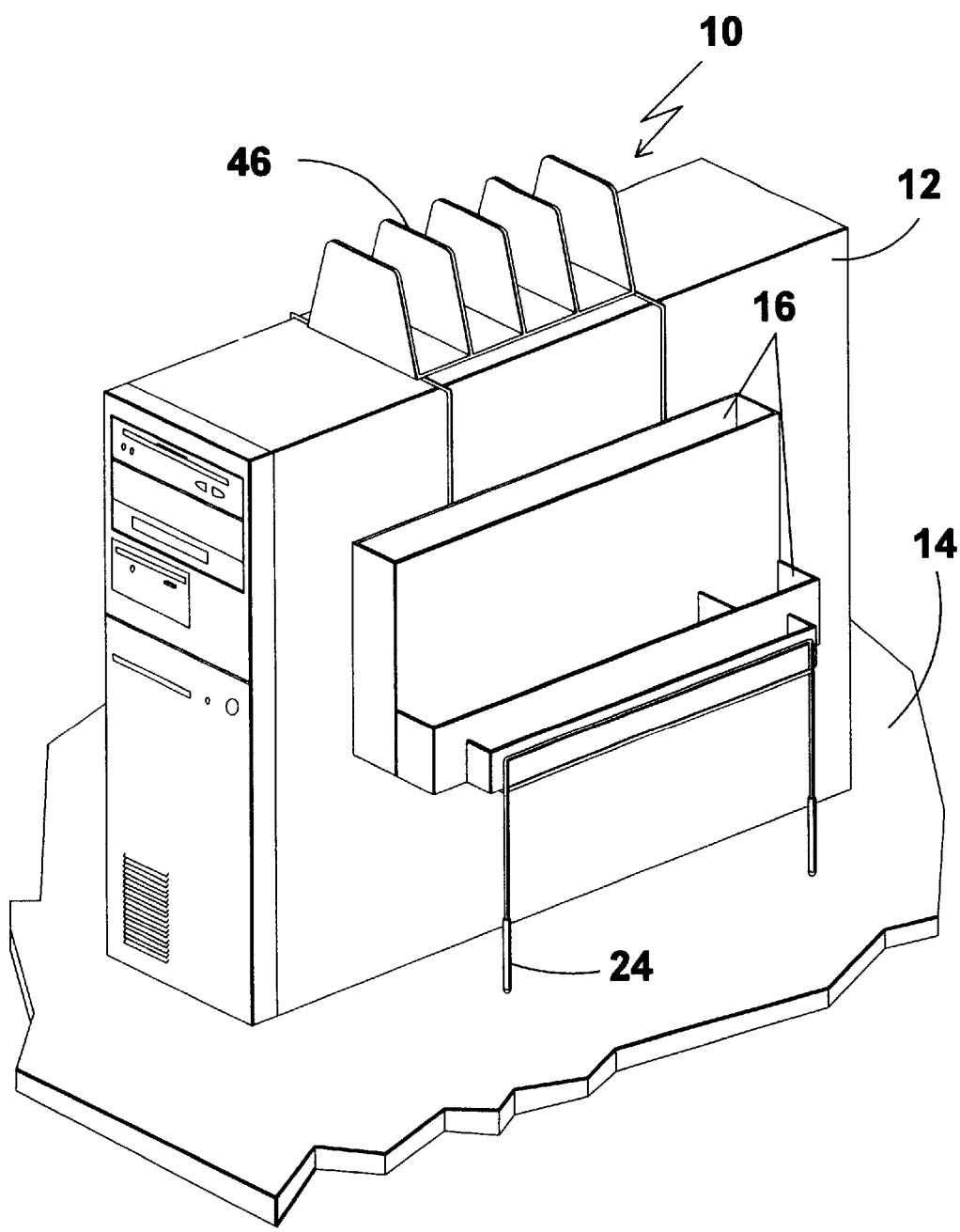
FIG. 13 is a perspective view of an alternate embodiment of the present invention. Shown is a personal computer having a plurality of bins and a compartment vertical file sorter providing means for the storage of various workstation articles such as papers, books, diskettes, CD-ROMs, notepads, writing implements, etc . . . , the organizer having means for adjusting the height and means for adjusting the width is adjustable to fit various tower-like personal computers.

Turning to FIG. to FIG. 13, shown therein is a perspective view of an alternate embodiment of the present invention 10. Shown is a personal computer 12 having a plurality of bins 16 and a compartment vertical file sorter 46 providing means for the storage of various workstation articles such as papers, books, diskettes, CD-ROMs, notepads, writing implements, etc. The organizer has means 24 for adjusting the height and means 28 (not shown) for adjusting the width to fit various tower-like personal computers 12.

Figure 14:
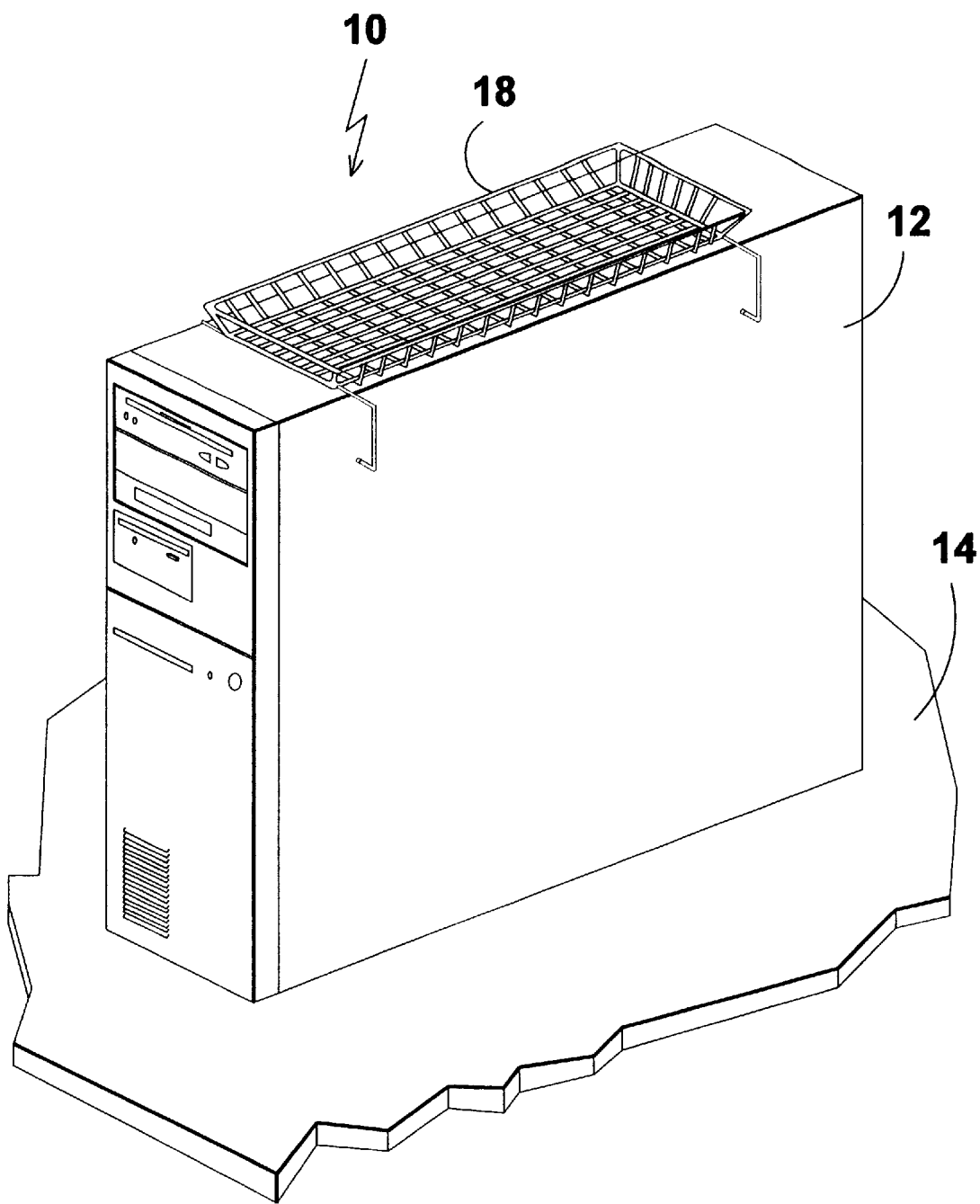
FIG. 14 is a perspective view of another alternate embodiment of the present invention. Shown is a personal computer having a wire frame basket having means for adjusting the width of the paper tray attachment providing means for said paper tray attachment to fit various tower-like personal computers.

Turning to FIG. 14, shown therein is a perspective view of another alternate embodiment of the present invention 10. Shown is a personal computer 12 having a wire frame basket 18 having means 28 (not shown) for adjusting the width of the paper tray or basket attachment 18 providing means for said paper tray 18 attachment to fit various tower-like personal computers 12.

Figure 15:
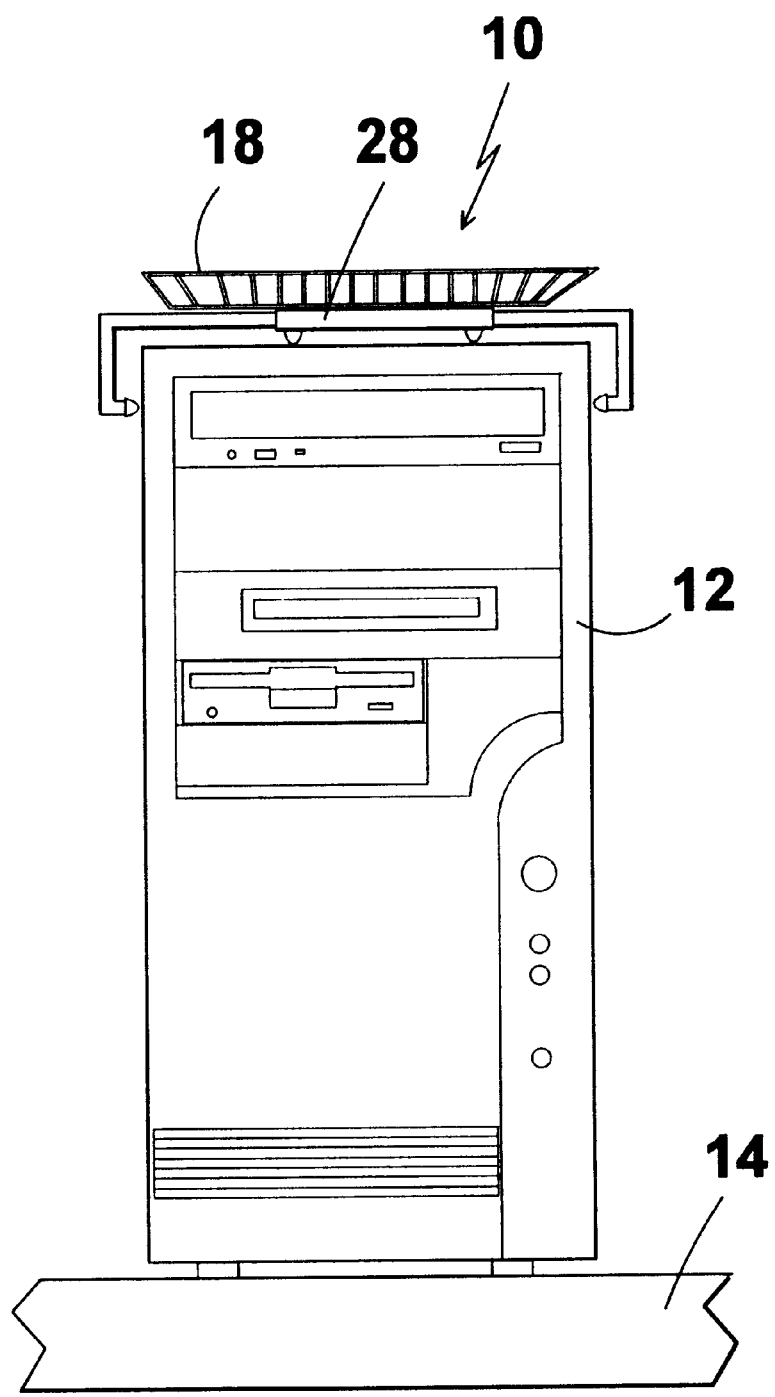
FIG. 15 is a front view of the alternate embodiment of the present invention as shown in FIG. 14. Shown is a personal computer having the wire frame basket attachment having means for adjusting the width of the paper tray attachment providing means for said paper tray attachment to fit various tower-like personal computers.

Turning to FIG. 15, shown therein is a front view of the alternate embodiment of the present invention 10 as shown in FIG. 14. Shown is a personal computer 12 having the wire frame basket 18 attachment having means 28 for adjusting the width of the paper tray 18 attachment to fit various tower-like personal computers 12. Downwardly extending legs 26 and pads 22 are also shown.

Figure 16:
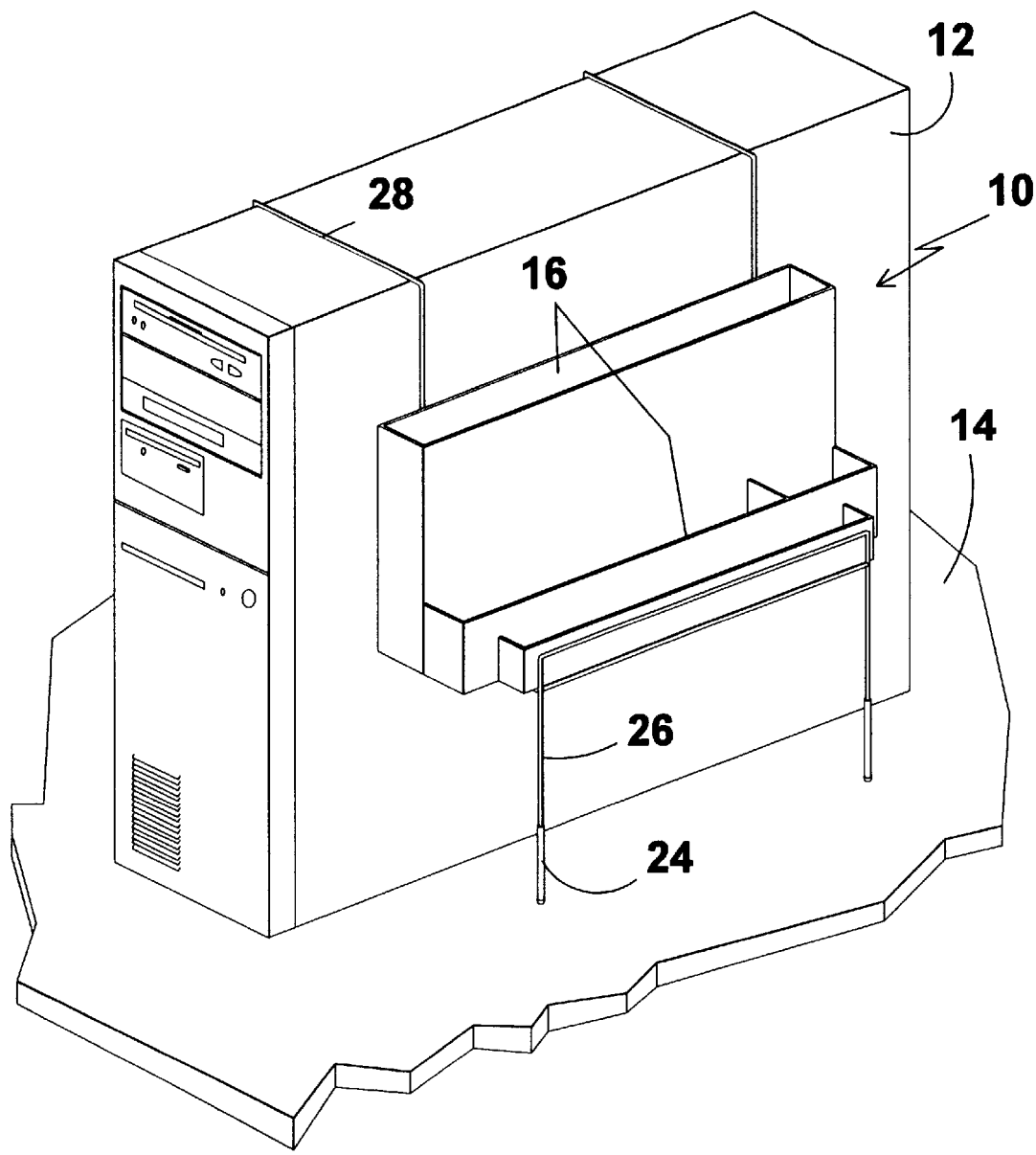
FIG. 16 is a perspective view of another additional embodiment of the present invention. Shown is the organizer having a plurality of bins attached to a personal computer. The organizer having means for adjusting the height of the leg member and having means for adjusting the width of the organizer would permit the use of said organizer with various tower-like computers.

FIG. 16 is a perspective view of another additional embodiment of the present invention 10. Shown is the organizer having a plurality of bins 16 attached to a personal computer 12. The organizer having means 24 for adjusting the height of the leg member 26 and having mean 28 for adjusting the width of the organizer would permit the use of said organizer with various tower-like computer 12.

Figure 17:
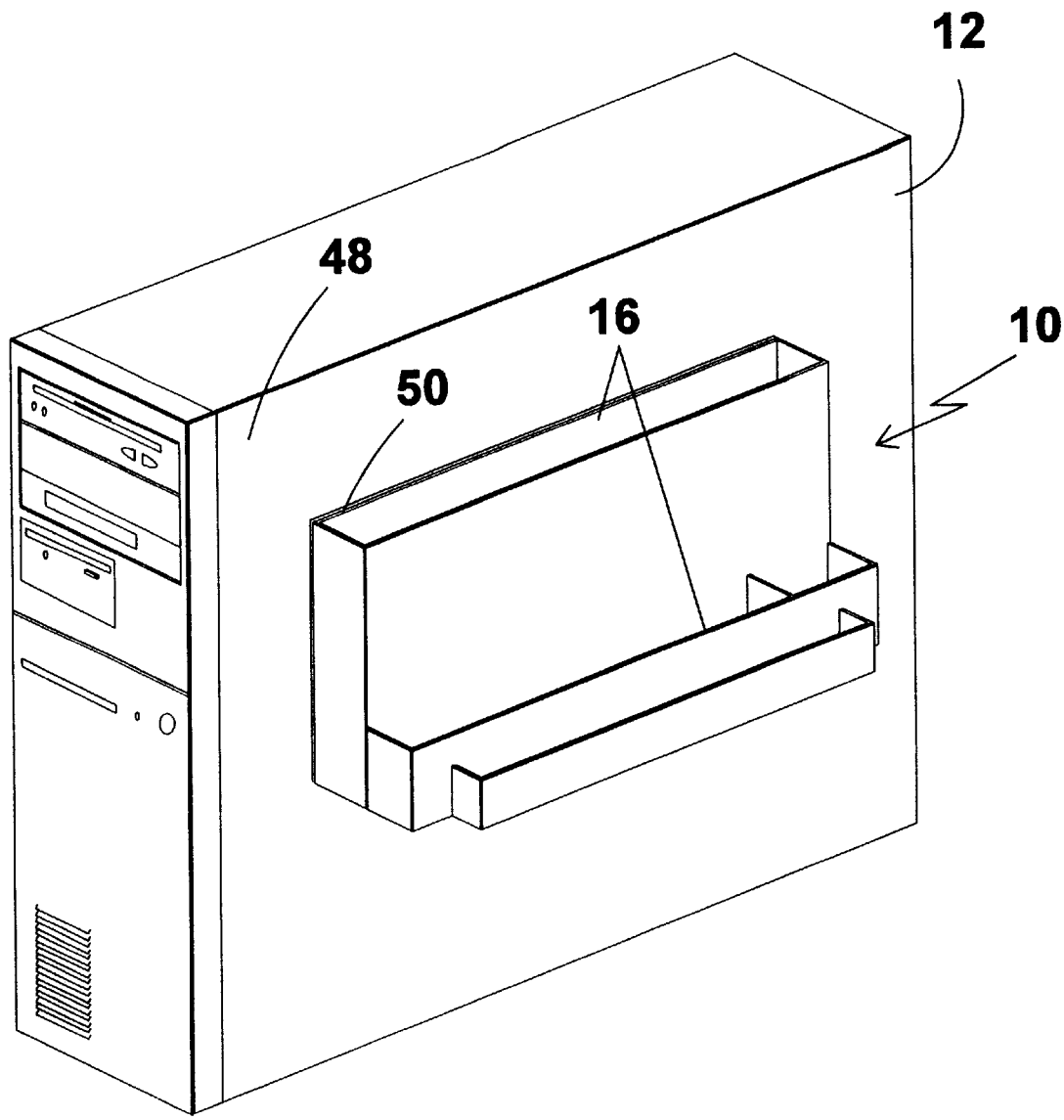
FIG. 17 is a perspective view of another additional embodiment of the present invention. Shown is the organizer having a plurality of bins magnetically, adhesively attached to the housing of the personal computer or manufactured together with the personal computer housing as one piece.

Turning to FIG. 17, shown therein is a perspective view of another additional embodiment of the present invention 10. Shown is the organizer having a plurality of bins 16 with means 50 for magnetically or adhesively attaching to the housing 48 of the personal computer 12 or manufactured together with the personal computer housing 48 as one piece.

I claim:

1. A system for storing articles mounted externally on, and in combination with, a personal computer tower located on a horizontal platform, comprising:

a) a plurality of storage bins each said bin forming a compartment open at the top for storing articles;

b) said storage bins positioned adjacent to each other in side by side relation on a first vertical side of said tower;

c) a frame support member having a pair of legs, said legs having a first section disposed horizontally underneath and supporting said plurality of bins and being at right angles to said first vertical side of said tower with proximal ends of said first section in contact with said first vertical side of said tower, said legs having a second section disposed vertically downwardly from distal ends of said first section for contacting said horizontal platform, said legs having a third section extending vertically upward from the proximal ends of said first section adapted to extend parallel to said first vertical surface and having a fourth section extending horizontally and rearwardly from the vertically extending third section of said frame member, said legs having a fifth section disposed vertically downward on a second vertical side of said tower opposite said first vertical side of said tower for securing said frame member to said tower;

d) the second section of said legs having means to adjust the height of said frame member from said platform;

e) said fourth section of said legs having support members to rest on a top horizontal surface of said tower and having means to adjust the width of said frame member on said horizontal surface of said tower; and f) a tray mounted on said fourth section for accommodating accessories and documentation.

2. The system of claim 1, wherein said frame member further comprises a plurality of stand-off members, said stand-off members further comprising pads, said pads contacting the tower for protecting the tower from the frame member.

3. The system of claim 1, wherein said means for adjusting the height further comprises mating male and female slidably engaging members, said means for adjusting the width further comprises mating male and female slidably engaging members.

* * * * *